Patented Aug. 17, 1954

2,686,711

UNITED STATES PATENT OFFICE 2,686,711

PROCESS FOR THE MANUFACTURE OF A DOUBLE CARBONATE OF LEAD AND SODIUM FROM INDUSTRIAL RESIDUES CONTAINING LEAD VALUES

Charles Lamquet and David Kusman, Brussels, Belgium, assignors of one-third to La Floridienne J. Buttgenbach & Cie. S. A., Brussels, Belgium, a company of Belgium, and one-third to Charles Lamquet, and one-third to David Kusman, both of Brussels, Belgium No Drawing. Application September 25, 1951, Serial No. 248,287

Claims priority, application Belgium March 20, 1951

8 Claims. (Cl. 23—61)

The present invention relates to the utilisation of lead-carrying materials, particularly of industrial residues containing lead sulphate, with the object of manufacturing a double carbonate rich in lead, which is particularly suitable for the manufacture of red lead.

In the manufacture of sulphuric acid, the plants for roasting pyrites and blendes produce considerable quantities of such residues which are recovered principally in the form of dust in electrostatic filters. Although such residues contain lead in the form of lead sulphate, these residues are practically valueless for the metallurgy of lead since their lead content is too low (from 4 to 35%) and because their content of various impurities, particularly arsenic and bismuth, is too high.

Broadly speaking, the process according to the present invention consists in exploiting these residues, or in general any material containing lead sulphate, by subjecting the same, after a previous lixiviation in order to extract the soluble impurities, to an extraction of the lead in two stages, of which the first comprises the dissolving of the lead by means of a concentrated solution of alkali metal hyposulphite with the object of separating-out not only silica and other insoluble impurities but also Sn, As, and Bi, the unstable hyposulphites of which are rapidly decomposed into sulphides, whereas the second stage comprises a treatment with sodium carbonate with the object of precipitating the lead in the state of sodium lead carbonate, while the salts of Ag, An and Hg remain in solution. These latter metals are subsequently recovered, and the hyposulphite solution may be used again.

The process is advantageously carried out in the following manner:

The lead carrying material is first lixiviated by means of water in order to extract the soluble salts such as the sulphates of iron, copper, zinc and cadmium.

After filtration the cakes of the filter presses are worked into a suspension in a solution of sodium hyposulphite in order to dissolve the lead and the other metals which are converted into hyposulphites, whereas the more inert materials ($SiO_2$, $Fe_2O_3$, $Al_2O_3$ etc.) remain insoluble. In view of the unstable character of the hyposulphites oftin, arsenic, antimony and bismuth, these metals are rapidly precipitated in the form of sulphides, which allows them to be separated by filtration simultaneously with the inert materials. Advantageously a solution containing 580 to 700 grams of alkaline hyposulphite per litre is used at a temperature below 30° C., preferably at about 25° C. This hyposulphite solution should be free from sulphite and from other salts having an alkaline reaction. The most favourable pH value is between 6 and 7.

Such a hyposulphite solution dissolves 125 grams or even more of lead sulphate per litre, and the extraction may attain 95% of the lead present. The reaction is as follows: $PbSO_4 + Na_2S_2O_3 = PbS_2O_3 + Na_2SO_4$.

The lead hyposulphite is soluble in an excess of the reagent and its going into solution is delayed very little by the presence of sodium sulphate as long as the latter does not substantially exceed 150 grams per litre.

The operation is preferably carried out quickly and in the cold in order to avoid the formation of lead sulphide, the lead solution becoming the more unstable the higher the temperature rises. In the cold condition, only very small quantities of PbS are formed. On the other hand, arsenic, antimony, tin and bismuth are transformed rapidly into sulphides, and precipitate. It is thus possible to free the lead solution of these metals by proceeding with a filtration before the lead sulphide has begun to form.

It is then a question of separating the lead contained in the filtrate from the metals (Ag, Au, Hg, Fe) which have remained in solution with it. For this purpose an almost saturated solution of sodium carbonate (250 to 300 grams per litre) is used. The two solutions are poured simultaneously into a mixer, with a slight excess of the sodium carbonate solution, in such a manner that the mixture always contains from 7 to 11 grams of free $Na_2CO_3$ per litre.

Under these conditions, the lead is precipitated almost completely in the form of a double carbonate of lead and of sodium, the formula of which corresponds to $5PbCO_3Na_2CO_3$. Whereas the precious metals and mercury remain in solution, the double carbonate precipitates in the form of a white powder, which after filtration, washing and drying, constitutes an excellent starting material for the production of red lead, litharge and other lead compounds of high quality.

The filtrate, which contains almost the whole of the hyposulphite as well as sodium sulphate and carbonate, can be returned into the cycle in order to serve for a new dissolution after having been neutralised by means of sulphuric acid. If desired, it may previously be treated in such a manner that the precious metals contained therein are recovered first.

Preferably one proceeds in the following manner:

The filtrate, which contains for example 450 to 500 grams of sodium hyposulphite, 50 to 150 grams of sodium sulphate, and 7 to 11 grams of sodium carbonate per litre, is divided into two parts. To one of these parts, diluted sulphuric acid is added in the required amount in order to bring it to a pH value of 6.5, and it is then utilised again for dissolving the lead sulphate.

To the other part, sodium sulphide is added, in order to precipitate Ag, Hg, Au, Fe, and the remaining Pb in the form of sulphides; then, after filtration, it is concentrated by evaporation up to 51° Bé. in order to precipitate the sodium sulphate which is then removed by filtration. The filtrate containing hyposulphite in a concentrated state is added to the weak solutions deriving from the washing of the foregoing operation, and is returned for the dissolution of lead sulphate.

According to a modification, which allows reconstitution of the hyposulphite destroyed by the separation of As, Sb, Sn and Bi, the neutralisation is effected with the aid of gaseous $SO_2$ instead of by means of a solution of sulphuric acid:

$$Na_2CO_3 + SO_2 = Na_2SO_3 + CO_2$$

For the precipitation of the precious metals in the form of sulphides, $Na_2S_2$ or $Na_2S_3$ are then used (which products are obtained by dissolving sulphur in a soltuion of $Na_2S$).

The precipitation of the sulphides then liberates the excess sulphur according to a reaction such as $$Na_2S_2 + PbS_2O_3 = PbS + Na_2S_2O_3 + S$$

By heating the liquid to about 75° to 80° C. the reconstitution of the hyposulphite by the reaction $$Na_2SO_3 + S = Na_2S_2O_3$$

is favoured.

The two methods of neutralisation may advantageously be carried out side by side; the part of the liquid which returns to the dissolution without purification is then neutralised with sulphuric acid, that part which is directed to purification and concentration is neutralised with anhydrous sulphurous acid.

The process described hereinabove, although particularly advantageous in its application to the treatment of residues poor in lead, is obviously likewise applicable to the treatment of materials richer in lead, such as the mud of lead chambers.

We claim:

1. A process of recovering lead values from lead sulphate carrying residues and materials, comprising subjecting the lead sulphate carrying material to lixiviation by means of water and then to the action of a concentrated alkali metal hyposulphite solution, thereby dissolving the lead in form of lead hyposulphite and treating the lead hyposulphite solution with sodium carbonate, thereby precipitating the lead in the form of sodium lead carbonate.

2. A process of recovering lead values from a lead sulphate containing material, comprising subjecting said material to lixiviation by means of water and then to the action of a concentrated alkali metal hyposulphite solution, thereby dissolving in the form of hyposulphites the lead together with any tin, arsenic, antimony and bismuth present, converting the unstable tin, arsenic, antimony and bismuth hyposulphites into sulphides, separating said sulphides from the lead hyposulphite solution before any appreciable amount of lead hyposulphite converts into lead sulphide, and treating said lead hyposulphite solution with a concentrated sodium carbonate solution, thereby precipitating the lead in the form of sodium lead carbonate.

3. In a process of recovering lead values as claimed in claim 2, carrying out the treatment with an alkali metal hyposulphite solution in presence of an excess of said hyposulphite at a temperature below 30° C.

4. In a process of recovering lead values as claimed in claim 2, carrying out the treatment with said sodium carbonate solution by allowing the hyposulphite solution and an almost saturated sodium carbonate solution to run simultaneously into a mixer, the latter solution being slightly in excess so that the mixture always contains from 7 to 11 grams of free $Na_2CO_3$ per litre, thereby favoring the precipitation of the sodium lead carbonate.

5. In a process of recovering lead values as claimed in claim 2, separating by filtration the precipitated sodium lead carbonate, neutralising the filtrate by sulphuric acid, separating the excess of sodium sulphate by evaporation of said filtrate, and using said filtrate for dissolving further quantities of said lead sulphate carrying material.

6. In a process of recovering lead values as claimed in claim 2, separating by filtration the precipitated sodium lead carbonate, dividing said filtrate into two portions, neutralising one of said portions by means of sulphuric acid and returning same into the circuit for dissolving further quantities of said lead carrying materials, neutralising the other of said portions by means of anhydrous sulphurous acid and treating same with sodium sulphide in order to precipitate sulphides of any metals dissolved, separating said metals by filtration, subjecting the filtrate to evaporation thereby precipitating sodium sulphate, separating the sodium sulphate by filtration from the concentrated solution, and returning the latter solution into the circuit for dissolving further quantities of said lead sulphate carrying material.

7. In a process of recovering lead values as claimed in claim 2, separating by filtration the precipitated sodium lead carbonate, dividing said filtrate into two portions, neutralising one of said portions by means of sulphuric acid and returning same into the circuit for dissolving further quantities of said lead carrying materials, neutralising said other portion of the filtrate by means of sulphur dioxide, treating same with a solution of sulphur in dissolved sodium sulphide, thereby precipitating any dissolved metals in the form of sulphides, heating the liquid thereby reconstituting the hyposulphite destroyed, filtering the liquid and returning same into the circuit for dissolving further quantities of said lead sulphate carrying material.

8. A double carbonate of lead and sodium consisting of the compound having the formula $5PbCO_3 \cdot Na_2CO_3$.

References Cited in the file of this patent

UNITED STATES PATENTS

| Number | Name | Date |
|---|---|---|
| 431,505 | Bronner | July 1, 1890 |
| 2,152,242 | Curtin | Mar. 28, 1939 |

OTHER REFERENCES

Abbegg et al.: "Handbuch der Anorganischen Chemie," vol. III (2nd ed.), page 729.